US005955132A

United States Patent [19]

Spica et al.

[11] Patent Number: 5,955,132

[45] Date of Patent: Sep. 21, 1999

[54] METHOD FOR ADDING FLAVOR MATERIALS TO BEVERAGES

[75] Inventors: Salvatore J. Spica, Morton, Pa.; John P. Kuhn, Wilmington, Del.; Steven R. Keller, Medford, N.J.; Joseph A. Winoker, Tampa, Fla.

[73] Assignee: Campbell Soup Company, Camden, N.J.

[21] Appl. No.: 07/705,391

[22] Filed: May 24, 1991

[51] Int. Cl.$^{6}$ .......... A23L 3/00

[52] U.S. Cl. .......... 426/399; 426/387; 426/388; 426/397; 426/599

[58] Field of Search .......... 426/386, 387, 426/388, 399, 401, 397, 407, 599, 330.5

[56] References Cited

U.S. PATENT DOCUMENTS

| | | | |
|---|---|---|---|
| 2,187,572 | 1/1940 | Meinzer . | |
| 2,512,513 | 6/1950 | Zahm | 426/387 |
| 2,552,525 | 5/1951 | Wenzelberger . | |
| 2,559,204 | 7/1951 | Wenzelberger . | |
| 2,588,337 | 3/1952 | Sperti . | |
| 2,735,779 | 2/1956 | Wenzelberger . | |
| 3,044,887 | 7/1962 | Smith et al. | 426/387 |
| 3,061,448 | 10/1962 | Mojonnier et al. | 426/387 |
| 3,087,822 | 4/1963 | Smith et al. | 426/387 |
| 3,113,876 | 12/1963 | Smith et al | 426/387 |
| 3,140,187 | 7/1964 | Brent | 426/387 |
| 3,579,349 | 5/1971 | Mishkin et al. . | |
| 3,787,593 | 1/1974 | Atkins et al. . | |
| 4,374,865 | 2/1983 | Strobel . | |
| 4,491,159 | 1/1985 | Colacci . | |
| 4,508,148 | 4/1985 | Trechsel et al. . | |
| 4,534,991 | 8/1985 | Kryger . | |
| 4,900,575 | 2/1990 | Cale et al. . | |

FOREIGN PATENT DOCUMENTS

| | | | |
|---|---|---|---|
| 698598 | 11/1964 | Canada | 426/387 |
| 1199215 | 1/1986 | Canada | 426/599 |
| 2526274 | 11/1983 | France | 426/399 |
| 58-51880 | 3/1983 | Japan | 426/399 |
| 2120077 | 11/1983 | United Kingdom | 426/399 |

*Primary Examiner*—Steven Weinstein
*Attorney, Agent, or Firm*—Banner & Witcoff, Ltd.

[57] ABSTRACT

A method of adding flavor essences, aromas, and concentrates to beverages. These essences aromas, and concentrates, or any other flavors or flavor mixtures are added to the beverage after it has been filled to volume in a container and just prior to the final sealing of the container with a closure or lid. A rotary liquid dispensing machine deposits small quantities of flavor materials and a vacuum scavenging system reclaims residual flavors from dispensing nozzles prior to a next filling cycle.

19 Claims, 5 Drawing Sheets

METHOD FOR ADDING FLAVOR MATERIALS TO BEVERAGES

TECHNICAL FIELD

The present invention relates to a method and apparatus for improving the flavor of beverages and, more particularly, to an improved method and apparatus for adding flavor essences, aromas, concentrates and the like to beverages.

BACKGROUND OF THE INVENTION

It has long been recognized that substantial flavors and essences are lost during the processing of juices. The prior art contains a number of processes for dealing with this problem. In these processes, lost essences are captured, concentrated, and returned to the batch process or in-line additions of the essences and flavors occur immediately following heating.

For example, U.S. Pat. No. 4,534,991 discloses a process for making an aseptic juice. As discussed therein, pasteurized ready to drink juices are typically shipped as pasteurized or frozen concentrate. They are then reconstituted with water at plants located near the ultimate market. Water soluble and oil soluble flavor ingredients are typically added back to the juice during reconstitution with water and the resulting reconstituted juice must again be pasteurized before the product can be placed in stores. Pasteurization is especially required if the juice is to be shelf-stable to any degree. The process described in the '991 patent adds an aseptic flavor system to the pasteurized reconstituted juice to avoid excessive heating after the flavor system has been added.

U.S. Pat. No. 2,588,337 to Sperti discloses a process for concentrating orange juice in which concentrated liquor is returned to and mixed with centrifuged concentrate so that the mixture contains practically all the valuable constituents of the fresh juice without material loss or deterioration of volatile flavor.

U.S. Pat. No. 3,140,187 to Brent discloses a method of making orange juice concentrate in which essence is added back to the orange juice concentrate in such a way that the concentrate and essence do not mix. After the essence has been added to the concentrate, the mixture is placed in containers for sealing and freezing.

U.S. Pat. No. 2,735,779 to Wenzelberger discloses a method of dehydration by freezing in which pulp removed from an earlier processing stage is reincorporated into the concentrate. The mixed concentrate then passes to the point of final packing.

However, in each of these cases, essences and flavors are again lost down line during, for example, pumping and filling operations. Thus, a problem of obtaining a highly flavorful product of consistent quality still remains.

SUMMARY OF THE INVENTION

Accordingly, it is an object of the present invention to provide a method of obtaining a highly flavorful beverage product.

It is another object of the present invention to provide a method of adding flavor materials to a beverage which avoids flavor loss during pumping and filling operations.

It is yet another object of the present invention to provide an apparatus for efficiently adding flavor materials to a beverage.

In accordance with the present invention, the problem of losses during the batching operations is overcome by postponing essence and flavor addition until the completion of all batching, thermal processing, and filling operations. After the beverage has been filled to volume in a container and just prior to the final sealing of the container with a closure or lid, the flavor or essence is introduced into the product. In accordance with this method, there is essentially no opportunity for further loss of flavor and essence and the product can be brought up to flavor efficiently and effectively.

To introduce the flavor or essence, a rotary liquid dispensing machine is used. The containers which have previously been filled to volume with a beverage, such as juice, are moved in a train along a predetermined path. A plurality of flavor or essence dispensing nozzle openings are rotated about an axis transverse to the container path, so that successive nozzle openings, when moving along the bottom portion of the arc of their motion, are positioned over and for a time move along with the containers. Flavors and essences dispensed from a given nozzle opening can thereby be caused to enter the top of the corresponding container.

In a preferred embodiment of the invention, a pressure shoe for dispensing the flavor or essence is provided with a vacuum recess positioned so as to become aligned with each nozzle opening shortly after each nozzle opening has ceased communication with a liquid manifolding recess of the shoe. The vacuum recess is preferably supplied continuously with a vacuum, whereby each nozzle, after it has terminated its dispensing action, is supplied with a vacuum to remove therefrom remaining flavors and essences, preferably supplying them to a recovery reservoir. This eliminates dripping from nozzle openings as they move between successive dispensing positions. Clogging of the nozzle openings is also eliminated. Finally, since only very small amounts of flavors and essences are to be added, e.g. 0.2 grams, the vacuum prevents any flavor and essences remaining in the nozzle from dripping into the container when dispensing is complete.

BRIEF DESCRIPTION OF THE DRAWINGS

These and other objects and features of the invention will be more readily understood from a consideration of the following detailed description, taken with the accompanying drawings, in which.

DETAILED DESCRIPTION OF SPECIFIC EMBODIMENTS

The present invention relates to the addition of flavor essences, aromas, concentrates, and the like. These will be collectively referred to as flavor materials.

Figure 1:
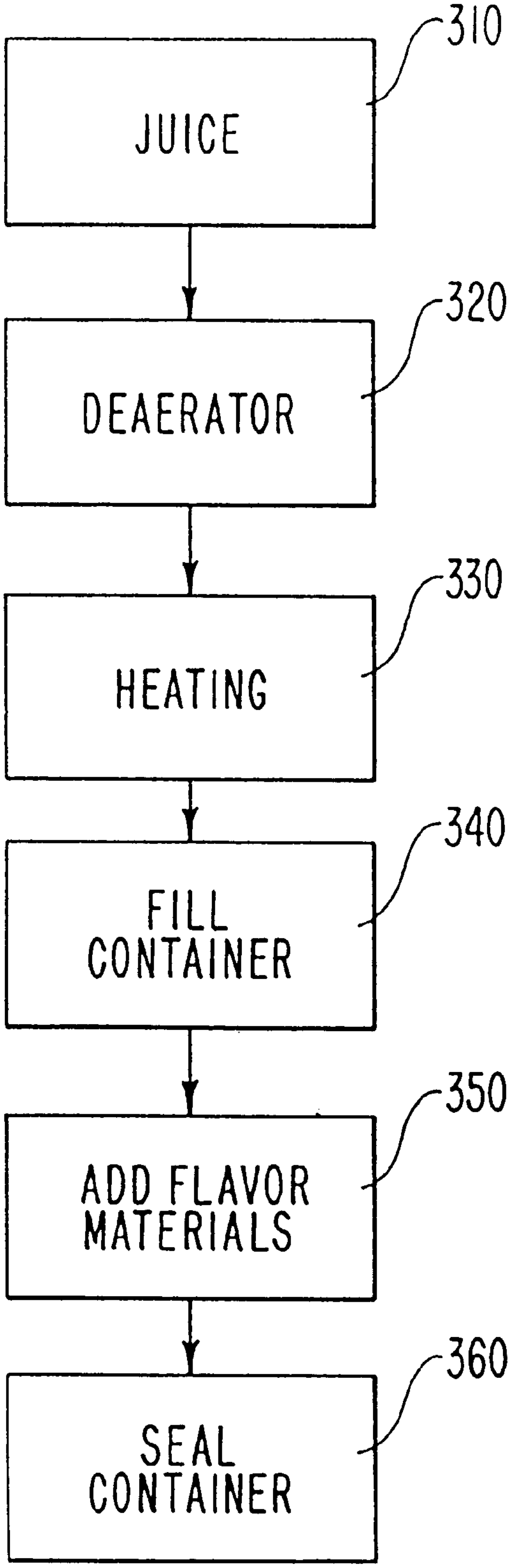
FIG. 1 is a flow chart illustrating the method of the present invention.

With reference to FIG. 1, a flow chart is provided illustrating the method of the present invention. In block 310, juice, such as orange juice, is provided. This juice may be fresh juice or may be reconstituted juice from pasteurized or frozen concentrate. As is common in the art, the juice is then passed through a deaerator in block 320 to remove oxygen from the juice to prevent oxidation of the flavor and/or other ingredients in the juice. The deaerated juice is then pasteurized in block 330 by heating to render the product sterile. The pasteurized juice is then dispensed into a container in block 340 by, for example, a rotary liquid dispensing machine as described in U.S. Pat. No. 4,491,159, the disclosure of which is incorporated herein by reference. After the juice is filled to volume in the container, the flavor or essence is added to the juice in block 350, preferably by an apparatus as described below. The flavor materials are provided, for example, from a reservoir, by gravity, to a metering pump which delivers essence or flavors to the dispensing nozzles. After the flavor essence has been added, the container is sealed in block 360.

In accordance with this method, a juice product with improved flavor is obtained as compared with a beverage product manufactured by conventional methods of flavor addition (i.e. by adding flavors to the product in the batch tank) and/or by methods which add flavor in-line to the product stream after heating. These conventional methods still permit flavor to be lost due to system effects such as pumping and filling. However, in accordance with the method of this invention, since the flavor or essence is introduced into the beverage just prior to the final sealing of the container, there is essentially no opportunity for further loss of flavor and essence.

It will be recognized that the present invention is not limited to particular methods for producing or recovering the essences or to particular methods for pasteurization. It is important, however, that essences and aromas, concentrates, etc. be added to the juice or beverage just prior to sealing the container, i.e., after pumping and filling and other system processes are carried out. Further, the essences or flavor additives may be recovered from the juice itself or otherwise generated.

Figure 2:
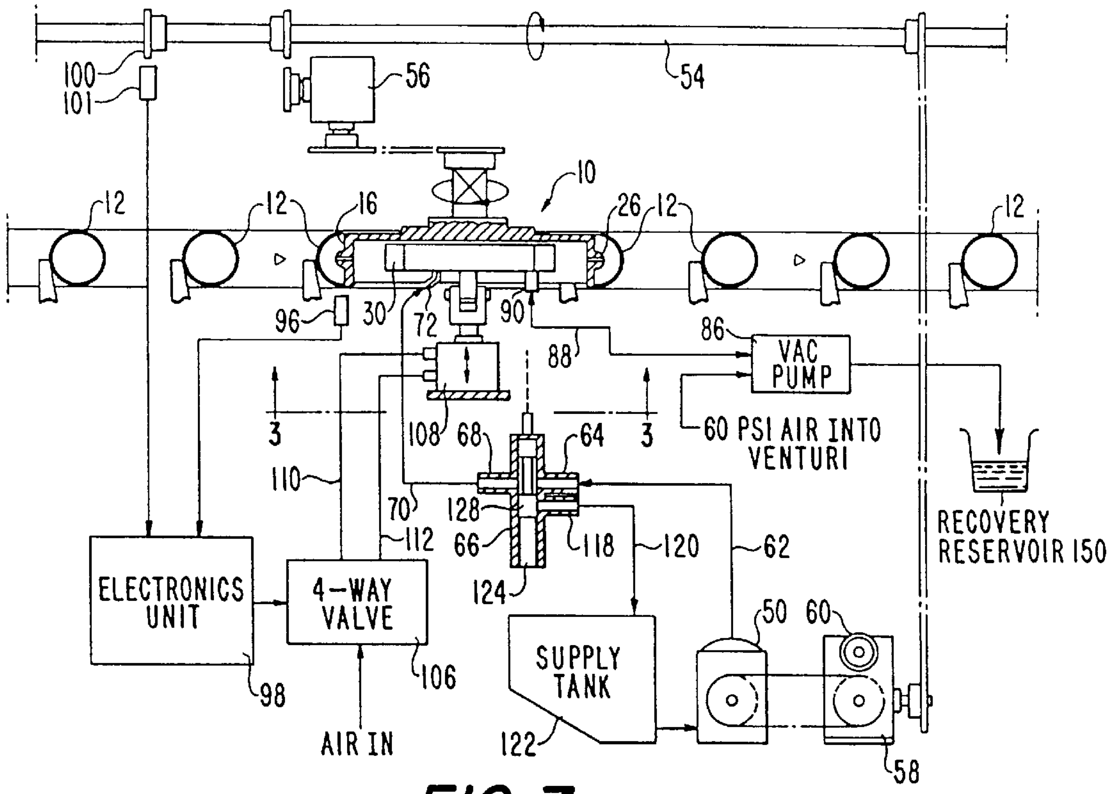
FIG. 2 is a schematic plan view of a system embodying the invention.
Figure 7:
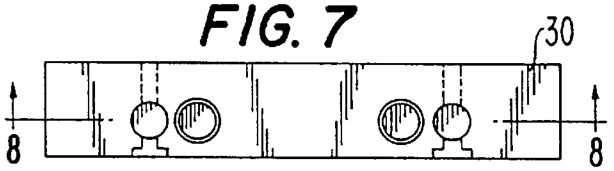
FIG. 7 is an enlarged plan view of the dispensing shoe of FIGS. 2–6.

FIG. 2 shows a preferred flavor material dispensing station 10 for dispensing flavor materials into containers which have been filled to volume with a beverage such as orange juice. Containers such as 12 pass in a sequential train beneath dispensing station 10, preferably equally spaced from each other and moving at a steady high speed. Each of the containers such as 12 is open-topped, and is to be supplied with a predetermined amount of flavor materials. Containers 12 may, for example, be metal cans, bottles, paperboard cartons, and the like, and the present invention is not limited in this respect.

Figure 3:
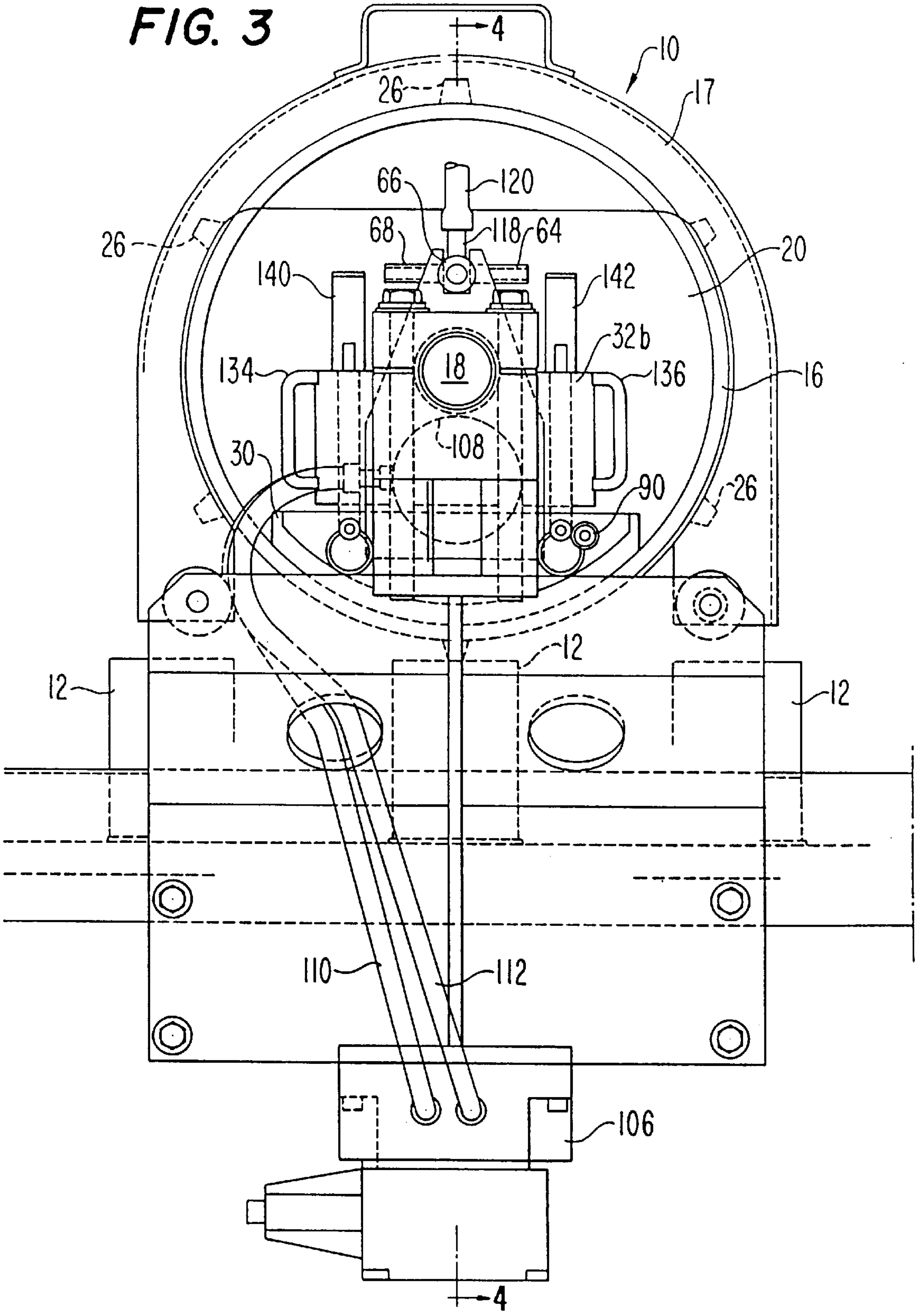
FIG. 3 is an enlarged front elevational view taken along lines 3—3 in FIG. 2.

Above the path of the containers 12 there is mounted a rotatable band 16 which is circular and rotatable on and about a fixed central axle 18 (FIG. 3) within a fixed housing 17. The latter axle is in this example horizontal, and extends at right angles to the direction of movement of the containers beneath it. The band is aligned with the path of the containers so that the band rotates directly above and along the centers of the open-topped containers 12.

In this example, the band 16 is integral with a plate 20 serving as a web to support the band for rotation about the axle 18. The band and the plate, taken together, constitute in effect an integral open-ended drum, rotatable about said axle.

Figure 5:
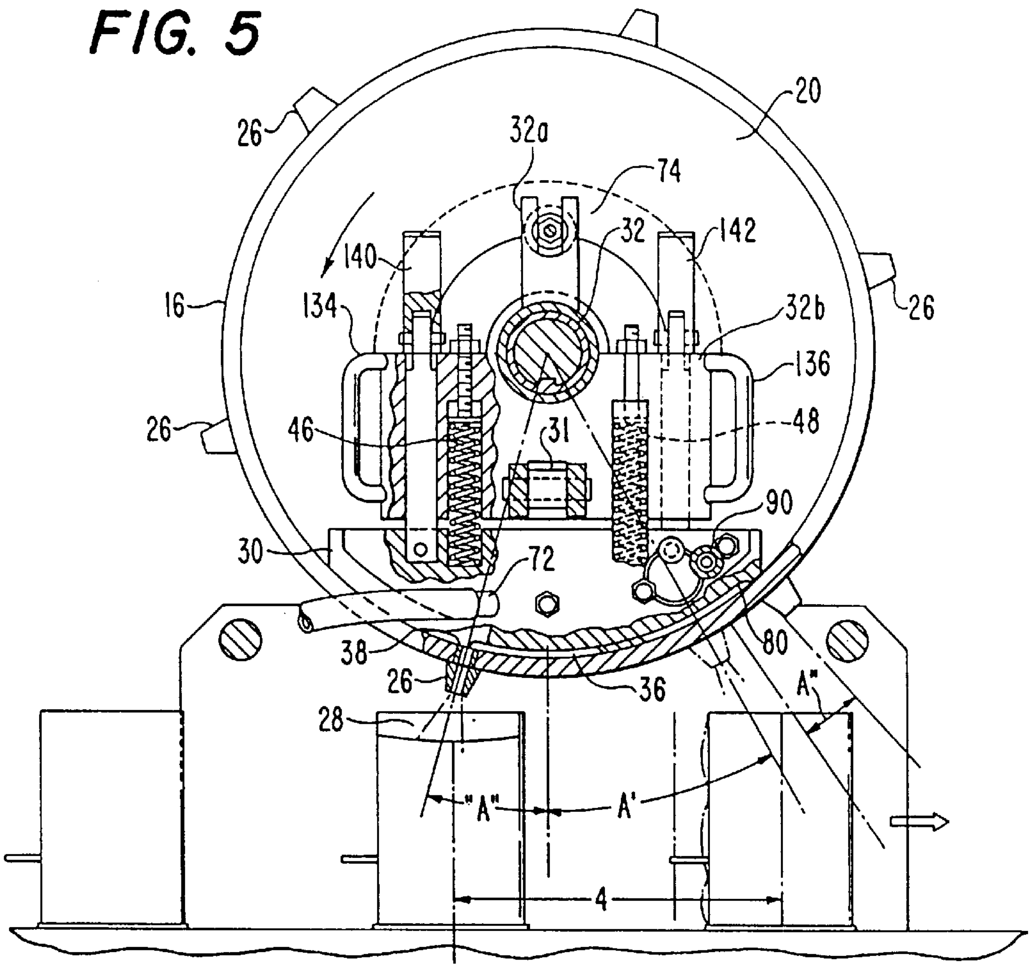
FIG. 5 is a fragmentary sectional view, in elevation, taken on lines 5—5 of FIG. 4.

Around the circumferential periphery of the band 16 are disposed six equally spaced-apart nozzle openings such as 26, so located axially that they rotate directly over the centers of the containers 12 and along the direction of motion thereof. It will be appreciated that more or less than six nozzles may be utilized. The inner diameter of nozzle 26 is preferably approximately 0.060 inch to control the flow of flavor material in small incremental quantities. Generally, the inside nozzle diameter is determined by the quantity to be dispensed and the product velocity to be tolerated without loss during deposit. As shown in FIG. 5, the system then operates so that as each container passes below the dispensing unit, one of the nozzle openings travels along and above it, typically delivering a stream of flavor material such as 28 to a container beginning at a time for which the stream from the nozzle is at an angle "A" with respect to the vertical, and terminating when the stream is at an angle A' on the opposite side of the vertical; typically, angle "A" may be about 15° and angle A' about 30°, for a total of 45° during which flavor material dispensing occurs. The total angle of "A" +A' is the arc length equal to the can pitch L. Angle "A" is adjustable to suit the can pitch line speed and flow direction into the container. These angles will vary in accordance with changes in line pitch. The next nozzle opening on the band then dispenses flavor material into the top of the next container, and so on as the band continues to rotate in synchronism with the passage of containers beneath it. Since the nozzle is travelling at the can speed when dispensing the flavor material, the stream also moves horizontally at this speed and hence is better able to reach its desired target area in the can.

Figure 6:
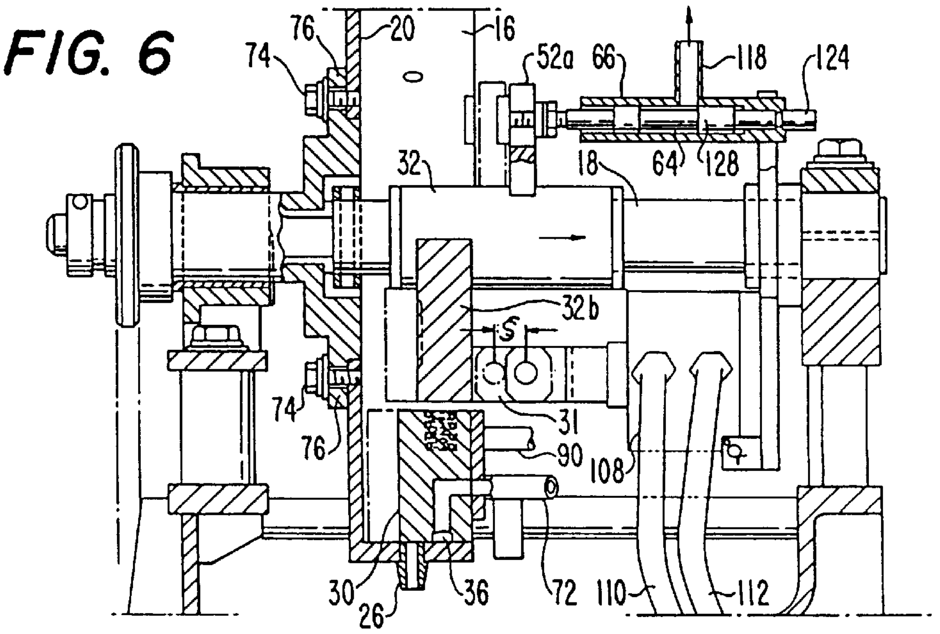
FIG. 6 is a fragmentary sectional view, in elevation, similar to FIG. 4 but showing it in the shut-off condition in which liquid dispensing is blocked.

To deliver flavor material to each of the nozzle openings in succession, there is provided a shoe 30, which shoe is axially slideable. Shoe 30 is normally fixed in the axial position shown, but is moved axially from this position in order to shut of f the delivery of flavor material to the nozzle openings, as shown in FIG. 6 and as described hereinafter.

As shown particularly clearly in FIGS. 7–9, and FIGS. 4, 5 and 6, the shoe 30 contains a chamber or recess 36 extending inward from its outer surface which serves as a nozzle output manifold and temporary storage chamber for the flavor material to be dispensed. Recess 36 is 0.19" wide, 0.062" deep and 2.00 long in a preferred emobidment. Preferably, the manifold handles liquid increments as small as 0.2 grams. Around the periphery of the manifolding recess 36, there is provided a resilient gasket 38 which bears against the interior side of the band 16. Shoe 30 (FIG. 4) is fixed against rotation about axle 18 by key 42, and is urged against the inner side of the band 16 by the helical spring members 46 and 48 (FIG. 5) so as to insure the desired liquid seal about the periphery of the flavor material manifolding recess 36.

As shown in FIG. 2, flavor material to be dispensed is continuously supplied by a positive-displacement rotary pump 50, the drive for which is coordinated with rotation of the band and with the travel of the containers along their predetermined path. Preferably this is accomplished by utilizing a common motive source, such as the can-closure rotating shaft 54 and appropriate conventional gearing 56 to maintain the above-described speed relationships for the pump, container conveyor and dispenser. To adjust the quantity of flavor material dispensed into each container, there is preferably employed a variable speed device 58 having a manual adjustment 60 for changing the speed of operation of the pump for a given speed of the gears which drive it.

The output of the positive displacement pump 50 is connected through tubing 62 to an inlet fitting 64 on spool valve 66, an outlet opening 68 of which is connected through tubing 70 to the flavor material inlet fitting 72 of shoe 30. The latter fitting communicates with the flavor material manifolding recess 36 of the shoe, so that a substantially constant pressure of flavor material is maintained in the recess. In this way, a predetermined controlled amount of the flavor material is dispensed into each container as each nozzle opening traverses the angle of the shoe occupied by the recess.

With this arrangement, the pump has an amount of time to dispense the flavor material which is equal to the time for the nozzle opening and band to rotate through the sum of the angles "A" and A' (FIG. 5), which is the same time as that required for each container to move through a distance L along its path. It is noted that the distance L is substantially greater than the diameter of a container, so that the time available for the present system to fill a rapidly-moving container with a predetermined amount of flavor material is very substantially greater than in a system in which a stationary, downwardly-pointing nozzle dispenses flavor material only during the time of travel of the container by a distance equal to one diameter of the container.

Figure 4:
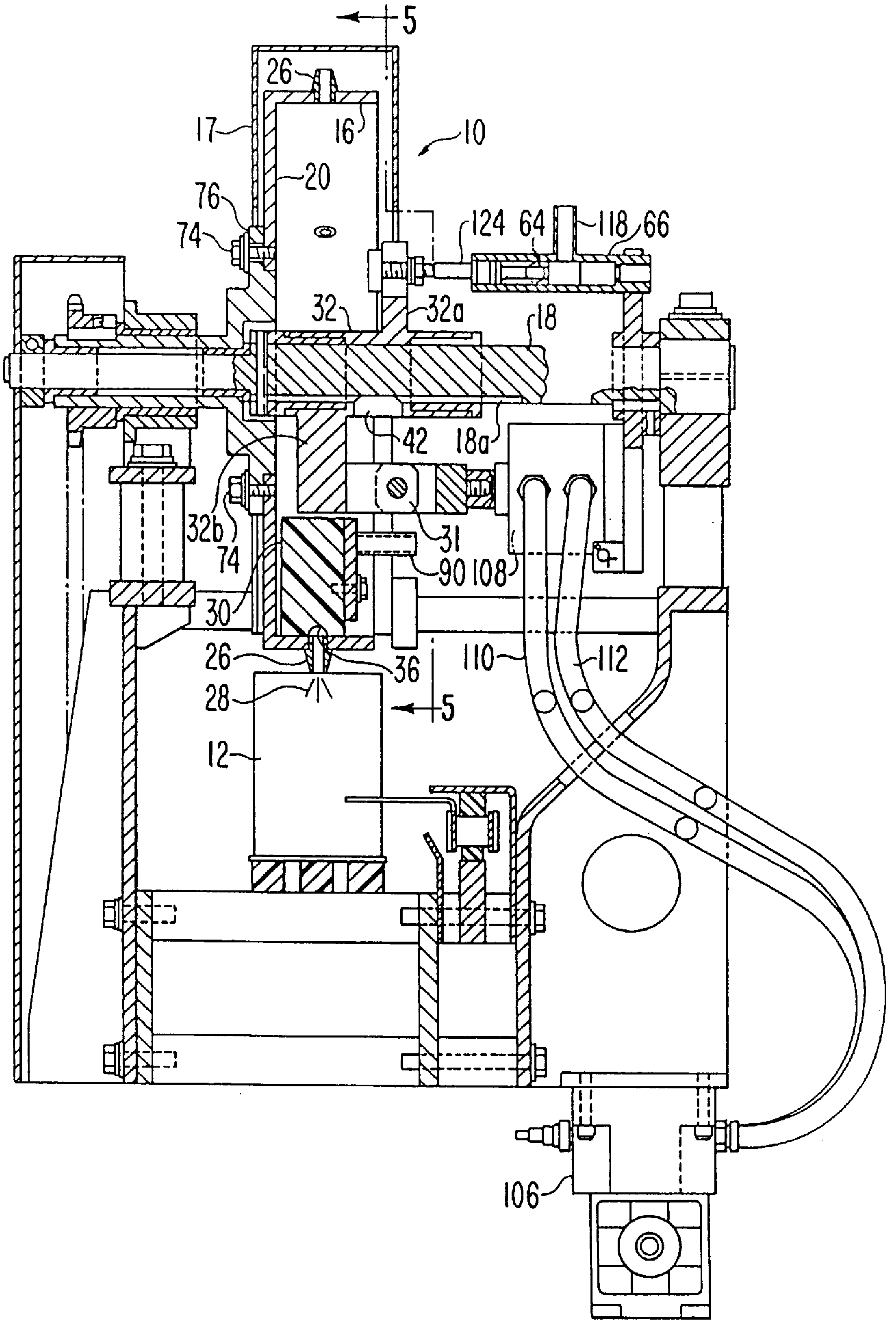
FIG. 4 is a sectional elevational view taken on lines 4—4 of FIG. 3.

Referring to FIGS. 4–6, to permit adjustment of the phase of rotation at which dispensing occurs, plate 20 is mounted by three bolts such as 74 extending through hub slots such as 76, into any selected three of six tapped holes in the plate 20, so that when the bolts are loosened the plate 20 and the band 16 can be turned to adjust the phase of dispensing and the bolts then replaced in the appropriate holes and tightened.

Figure 8:
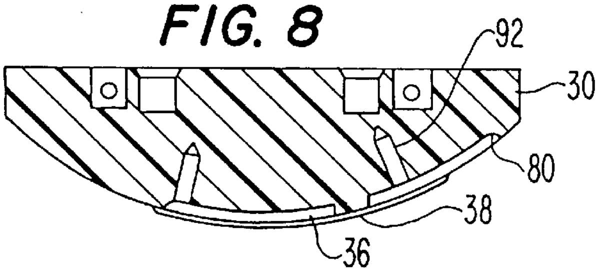
FIG. 8 is a sectional elevational view of the shoe of FIG. 7, taken on lines 8—8.
Figure 9:
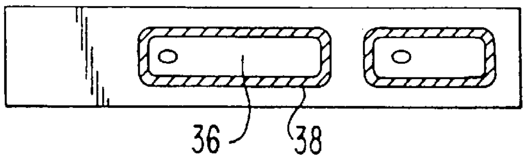
FIG. 9 is a bottom plan view of the shoe.

As shown particularly clearly in FIGS. 5, 8 and 9, there is preferably also provided a vacuum recess 80 in the surface of shoe 30, the recess being positioned just beyond the manifold recess 36 as shown. Vacuum recess 80 is 0.19" wide, 0.62" deep, and 1.12" inches long in a preferred embodiment. A vacuum pump 86 at 27" mercury and coupled to an air supply at 60 PSI is connected through tubing 88 to an inlet fitting 90 on shoe 30, and is connected interiorly of the shoe through interior passage 92 to recess 80. With this arrangement, a vacuum is constantly being applied to recess 80, and for most of the cycle of rotation of band 16, vacuum is blocked by band 16. However, each time a nozzle traverses the vacuum recess 80, a vacuum is applied through that nozzle to clear out remaining droplets of flavor materials which may be clinging thereto. Preferably this is done during the last portion of the time during which the nozzle is aligned with the open top of its corresponding container, i.e. during the traversal of the angle A". The vacuum pump delivers the flavor material into a recovery reservoir 150. Alternatively, the flavor material may be delivered to supply tank 122. It will be apparent that, alternatively, the vacuum may be applied to the nozzle prior to delivery of the flavor material.

Also preferably provided is a NO-container detector 96, positioned along the path of the containers just upstream of the dispensing station (see FIG. 2). Such devices are well known in the art and need not be described in detail. For example, if the containers are metal cans, detector 96 may comprise a commercial metal detector producing an electrical output signal indicative of whether a metal container is passing the detector or not. The purpose of this detector is to prevent the dispenser from dispensing flavor material into an empty gap between containers when a container is missing from the train for any reason. Detectors using IR radiation, for example, may be used with non-metal containers.

The signal from the NO-container detector is supplied to a conventional electronics unit 98 which is also supplied with signals from a shaft-angle pickoff disc 100 on shaft 54, which rotates in synchronism with the rate of delivery of containers by the conveyor, i.e. at a rate of one cycle per container. A shaft-angle pickoff member 101 is angularly positioned to produce an electrical output signal at a pre-set angular position of pick-off disc 100, preferably at, or very slightly before, the time when the corresponding nozzle opening would begin to dispense liquid into the empty gap created by the absence of the container. The electronics unit 98 performs an AND function and operates four-way valve 106 only when the detector signal indicative of the absence of a container and the shaft-pickoff signal occur contemporaneously. Operation of the four-way valve 106 then applies pressure to the air cylinder 108 by way of hoses 110 and 112 to suddenly drive the shoe 30 axially to its outer position in which the nozzle openings are no longer in circumferential alignment with the flavor material-manifolding recess 36, and hence dispensing is inhibited. When the detector senses the next container, the electronics unit operates the four-way valve to drive the shoe 30 rapidly back to its normal axial position, as desired.

When the shut-off mechanism has moved the shoe axially to block the dispensing of flavor material through the nozzle openings, it is highly desirable to provide an alternate path for the liquid during operation of the positive-displacement pump. Accordingly, spool valve 66 is provided with a relief or liquid-diversion outlet port 118 connected through hose 120 to storage container 122. The spool 124 of valve 66 is mechanically connected directly to the shoe support mechanism, so that when shoe 30 is moved axially during the NO-container shut-off operation, spool 124 is positively driven in the same direction, whereby land 128 of the spool uncovers port 118 and permits flavor material flow out of port 118 to relieve the pressure created by the pump at such times. As shown, the normal outlet port 68 remains exposed to the flavor material flow in valve 66 even during shut-off, so that a small amount of flavor material is bled to and through the manifolding recess 36, assuring that the dispensing system will be full of flavor material and immediately ready to dispense as soon as the shoe returns to its normal axial position.

In the preferred embodiment shown, the shoe 30 is mounted for axial and non-rotational displacement along the fixed shaft 18. To this end, a cylindrical sleeve member 32 having bushings mounted in both terminal ends is axially and slidably retained on the shaft 18 and rotational displacement prevented by means of the key 42 riding in key slot **18*a* of the fixed shaft 18. The sleeve member 32 has in addition an upper vertically-extending tang member 32*a* having at its outermost terminal end a bifurcated portion that engages and retains the valve spool 124. In addition, the cylindrical sleeve member has a lower depending rectangular block member 32*b*, containing suitable cavities for the retention of spring members 46 and 48. The compression of the springs between the shoe 30 and the inner surface of the flange 16 may be adjusted by adjustment means shown, mounted on the upper surface of the block member 32*b*. The block member also has two vertically-extending bores for the slidable retention of two tie bars whose upper terminal ends are pivotally secured to the cam actuators 140 and 142 and whose lower terminal ends extend into mating bores in the shoe 30. The shoe 30** is fixedly secured to the tie bars by means of two quick-release pins.

Centrally located and axially aligned with shaft 18 on the block **32*b* there is carried a forwardly extending tang 31 for pivotal connection, by means of a clevis, to the actuator of the ram 108 which, when actuated, moves the sleeve member 32, tang 32*a*, block 32*b*, and shoe 30 axially along shaft 18**.

Handles 134 and 136 are carried on the block 32*b* for manual removal and replacement of the elements just described, assuming that the cam actuators 140 and 142 have been operated to withdraw the shoe 30 from band 16, and various hoses, the ram, and the spool valve have been disconnected.

While the invention has been described with particular reference to specific embodiments in the interest of complete definiteness, it will be understood that it may be embodied in a large variety of forms diverse from those specifically shown and described without departing from the spirit and scope of the invention as defined by the appended claims.

What is claimed is:

1. A method of preparing a beverage, the method comprising the steps of:

(1) filling a container with the beverage to a predetermined volume using an automated filling apparatus which moves and fills the container along a moving path with other containers;

(2) adding fluent flavor materials to the beverage in the container after the beverage has been filled to said predetermined volume in said container by dispensing the fluent flavor materials using an automated liquid dispenser; and (3) sealing said container; wherein step (2) is performed just to step (3) to prevent loss of said fluent flavor materials from the container.

2. The method of claim 1, wherein step (2) comprises the step of using an essence as the fluent flavor materials.

3. The method of claim 1, wherein step (2) comprises the step of using an aroma as the fluent flavor materials.

4. The method of claim 1, wherein step (2) comprises the step of using a concentrate as the fluent flavor materials.

5. The method of claim 1, wherein step (2) comprises the step of using an aseptic liquid as the fluent flavor materials.

6. The method of claim 1, wherein step (2) comprises the step of using a rotary dispenser to add the fluent flavor materials.

7. The method of claim 1, wherein step (1) comprises the step of using fruit juice as the beverage.

8. The method of claim 1, wherein step (2) is performed immediately after step (1).

9. A method of preparing a juice product comprising the steps of:

(1) deaerating the juice to remove oxygen therefrom;

(2) heating the deaerated juice to sterilize the juice;

(3) filling a container with the juice to a predetermined volume using an automated filling apparatus which moves and fills the container along a moving path with other containers;

(4) adding fluent flavor materials to the juice after the juice has been filled to said predetermined volume in said container by dispensing the fluent flavor materials using an automated liquid dispenser; and (5) sealing said container; wherein step (4) is performed just prior to step (5) to prevent loss of said fluent flavor materials from said container.

10. The method of claim 9, wherein step (4) comprises the step of using an essence as the fluent flavor materials.

11. The method of claim 9, wherein step (4) comprises the step of using an aroma as the fluent flavor materials.

12. The method of claim 9, wherein step (4) comprises the step of using a concentrate as the fluent flavor materials.

13. The method of claim 9, wherein step (4) comprises the step of using an aseptic liquid as the fluent flavor materials.

14. The method of claim 9, wherein step (4) comprises the step of using a rotary dispenser to add the fluent flavor materials.

15. The method of claim 9, wherein step (3) comprises the step of filling the container with fruit juice.

16. The method of claim 9, wherein step (4) is performed immediately after step (3).

17. A method of adding flavor materials to a beverage, comprising the steps of:

(1) moving a plurality of containers in a train along a path using an automated machine;

(2) dispensing a predetermined quantity of the beverage into each of the plurality of containers using a fist liquid dispenser;

(3) following step (2), dispensing a flavor essence into each of the plurality of containers using a second liquid dispenser; and (4) sealing each of the plurality of containers; wherein step (3) is performed just prior to step (4) in order to prevent loss of the flavor essence from each container.

18. The method of claim 17, wherein step (3) comprises the step of using a rotating liquid dispenser to dispense the flavor essence into each of the plurality of containers.

19. The method of claim 18, wherein step (3) comprises the step of rotating the second liquid dispenser along the same direction of travel as the plurality of containers while the flavor essence is being dispensed.

* * * * *

UNITED STATES PATENT AND TRADEMARK OFFICE

CERTIFICATE OF CORRECTION

PATENT NO. : 5,955,132

DATED : September 21, 1999

INVENTOR(S) : Salvatore J. SPICA, *et al.*

It is certified that error appears in the above-identified patent and that said Letters Patent is hereby corrected as shown below:

Column 7, claim 1, line 27 after "just" insert --prior--.

Signed and Sealed this

Eighteenth Day of April, 2000

Attest:

Q. TODD DICKINSON

Attesting Officer

*Director of Patents and Trademarks*